(12) United States Patent
Ujiie

(10) Patent No.: US 8,992,031 B2
(45) Date of Patent: Mar. 31, 2015

(54) IMAGING APPARATUS

(75) Inventor: Hirotaka Ujiie, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 13/212,952

(22) Filed: Aug. 18, 2011

(65) Prior Publication Data

US 2012/0050861 A1    Mar. 1, 2012

(30) Foreign Application Priority Data

Aug. 24, 2010 (JP) ................. 2010-187127

(51) Int. Cl.
| | | |
|---|---|---|
| *G02B 23/16* | (2006.01) | |
| *H04N 5/225* | (2006.01) | |
| *G02B 25/00* | (2006.01) | |
| *G02B 27/00* | (2006.01) | |
| *G03B 13/06* | (2006.01) | |

(52) U.S. Cl.
CPC .............. *H04N 5/2251* (2013.01); *G02B 23/16* (2013.01); *G02B 25/005* (2013.01); *G02B 27/0006* (2013.01); *G03B 13/06* (2013.01)
USPC ............................ 359/511; 359/513; 359/611

(58) Field of Classification Search
CPC .......... G02B 7/00; G02B 7/003; G02B 7/004; G02B 7/006; G02B 7/007; G02B 7/02; G02B 7/022; G02B 7/023; G02B 7/026; G02B 7/20; G02B 7/22; G02B 25/02; G02B 27/00; G02B 27/0006
USPC .................. 359/507–513, 600, 611, 808–819
See application file for complete search history.

(56) References Cited

U.S. PATENT DOCUMENTS

| | | | | |
|---|---|---|---|---|
| 4,037,926 A | * | 7/1977 | Spence-Bate | 359/469 |
| 4,698,857 A | * | 10/1987 | Kastendieck et al. | 2/426 |
| 5,818,634 A | * | 10/1998 | Richard et al. | 359/565 |
| 7,719,612 B2 | * | 5/2010 | Kaihara et al. | 348/374 |

FOREIGN PATENT DOCUMENTS

| | | |
|---|---|---|
| JP | H05-068189 A | 3/1993 |
| JP | 10-191112 A | 7/1993 |
| JP | 2002-369043 A | 12/2002 |
| JP | 2007-201790 A | 8/2007 |
| WO | 2010/007747 A | 1/2010 |

* cited by examiner

*Primary Examiner* — Thong Nguyen
(74) *Attorney, Agent, or Firm* — Canon USA Inc IP Division

(57) ABSTRACT

An imaging apparatus includes: a display module; a dust-proof plate arranged on an observer side of the display module and configured to substantially seal a surface of the display module; an eyepiece lens arranged on the observer side of the dust-proof plate and movable in an optical axis direction; and a cover member retaining the dust-proof plate and the eyepiece lens, wherein the cover member has an opening for removing foreign matter adhering to the surface of the dust-proof plate opposed to the eyepiece lens and to the surface of the eyepiece lens opposed to the dust-proof plate.

5 Claims, 16 Drawing Sheets

IMAGING APPARATUS

BACKGROUND OF THE INVENTION

1. Field of the Invention

The present invention relates to an imaging apparatus, and, in particular, to an imaging apparatus equipped with a viewfinder.

2. Description of the Related Art

Conventionally, the viewfinder of an imaging apparatus displays an image on a liquid crystal display unit based on a video signal during shooting. And, the image displayed on the liquid crystal display unit is enlarged at an eyepiece lens.

However, any foreign matter such as dust adhering to the interior of the viewfinder hinders the observation of the image. In view of this, as is known in the art, a dust-proof glass is provided between the eyepiece lens and the eyepiece opening to seal up the interior of the viewfinder. Further, Japanese Patent Application Laid-Open No. 5-68189 discusses a construction in which the dust-proof glass is arranged in an inclined state so that the external light may not be reflected by the dust-proof glass.

However, in the construction discussed in Japanese Patent Application Laid-Open No. 5-68189, in which the dust-proof glass is arranged in an inclined state between the eyepiece lens and the eyepiece opening, it is necessary to provide space, resulting in an increase in the size of the viewfinder. On the other hand, in the case where the dust-proof glass is arranged without being inclined, it is necessary for the surface of the dust-proof glass to be provided with coating for preventing reflection, resulting in an increase in man-hours and cost.

It might be possible to adopt a structure in which the interior of the viewfinder is not completely sealed and in which the interior of the viewfinder is cleaned by a blower as appropriate. However, a display module arranged inside the viewfinder is very subject to fracture, and there is danger of the display module suffering damage by the blower during cleaning or the like.

SUMMARY OF THE INVENTION

According to an aspect of the present invention, an imaging apparatus includes: a display module; a dust-proof plate arranged on an observer side of the display module and configured to substantially seal a surface of the display module; an eyepiece lens arranged on the observer side of the dust-proof plate and movable in an optical axis direction; and a cover member retaining the dust-proof plate and the eyepiece lens, wherein the cover member has an opening for removing foreign matter adhering to the surface of the dust-proof plate opposed to the eyepiece lens and to the surface of the eyepiece lens opposed to the dust-proof plate.

According to the present invention, it is possible to protect the display module arranged inside the viewfinder while adopting a structure not requiring complete sealing-up of the interior of the viewfinder of the imaging apparatus and allowing cleaning of the interior of the viewfinder by a blower.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 16:
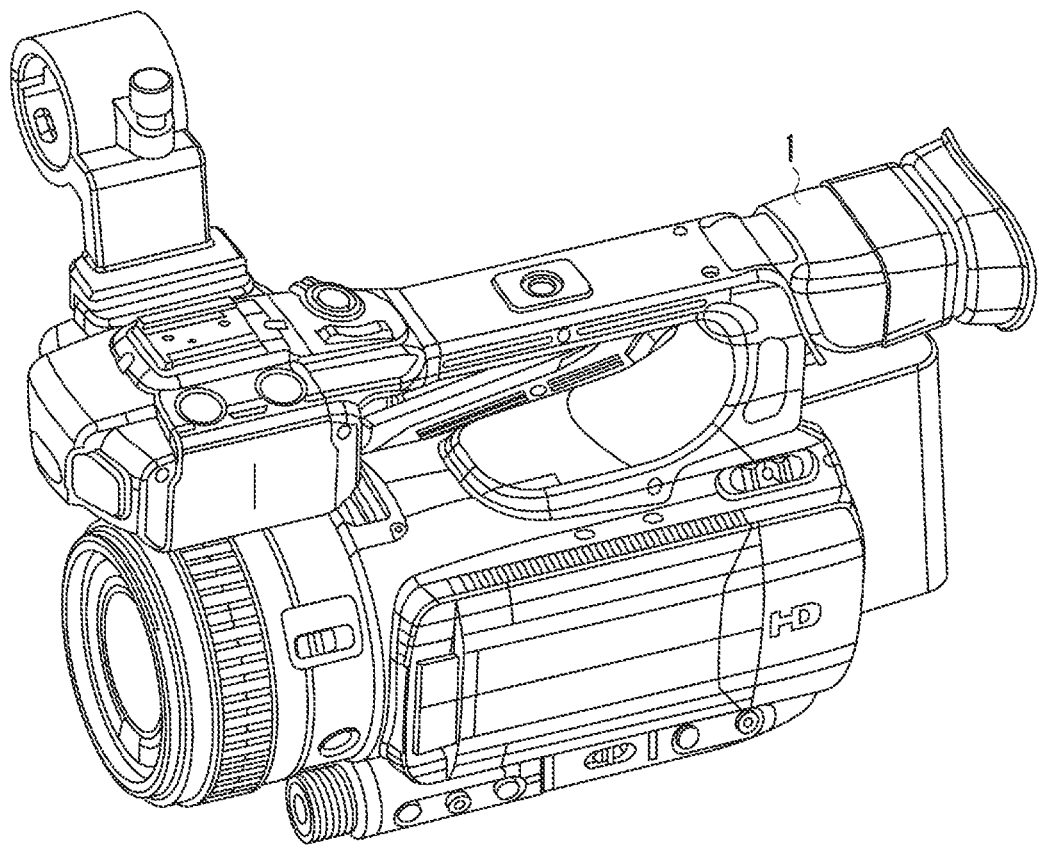
FIG. 16 is an external perspective view of a video camera constituting an example of an imaging apparatus according to an exemplary embodiment of the present invention.

FIG. 16 is an external perspective view of a video camera constituting an example of an imaging apparatus to which the present invention is applied. As illustrated in FIG. 16, the video camera is equipped with a viewfinder 1.

Figure 1:
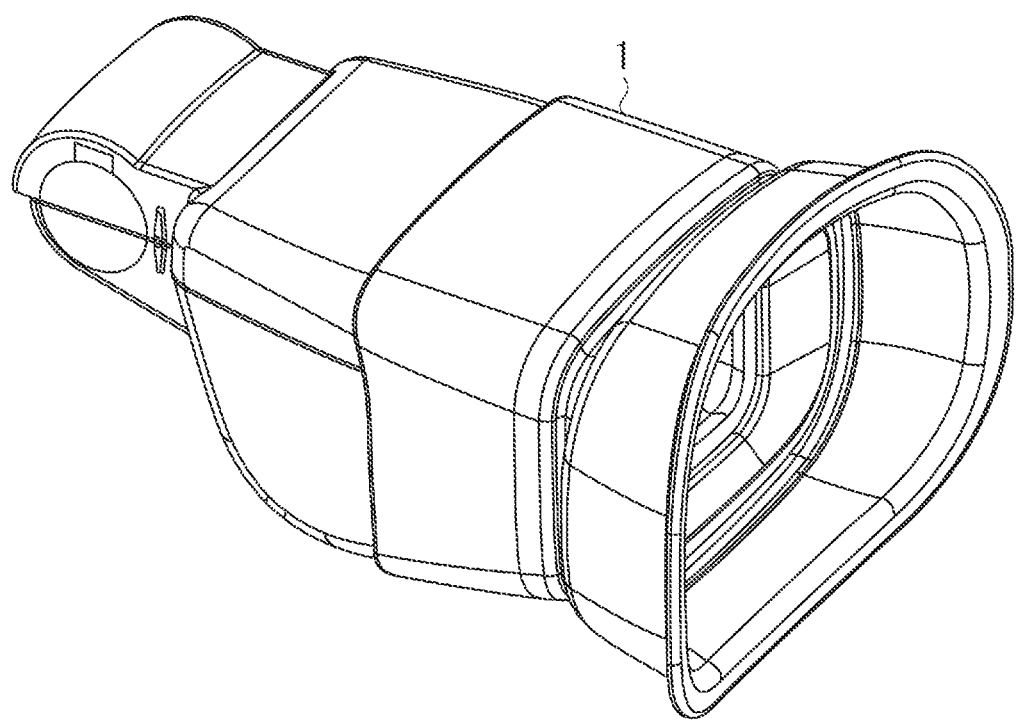
FIG. 1 is an external perspective view of a viewfinder.

FIG. 1 is an external perspective view of the viewfinder 1. As illustrated in FIGS. 1 and 16, in the present exemplary embodiment, the upper, lower, right-hand, and left-hand sides of the viewfinder 1 as seen from the observer side will be defined as the upper, lower, right-hand, and left-hand sides of the imaging apparatus.

Figure 2:
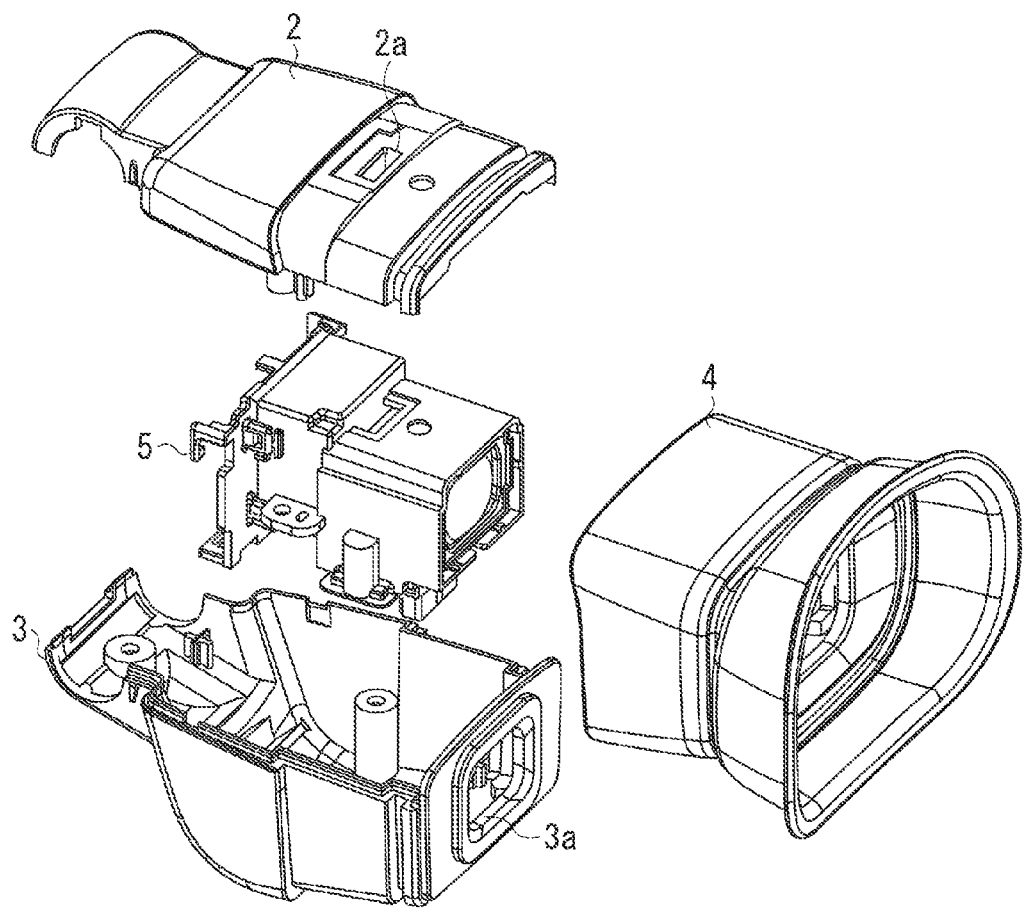
FIG. 2 is an exploded perspective view of the viewfinder.

FIG. 2 is an exploded perspective view of the viewfinder 1.

The viewfinder 1 is constructed such that a viewfinder assembly 5 is covered with an upper cover 2, a lower cover 3, and an eyecup 4 that is attachable/detachable by the observer. An opening 2a is formed in the upper cover 2. The lower cover 3 has an opening 3a through which an eyepiece lens unit portion 7 is exposed.

Figure 3:
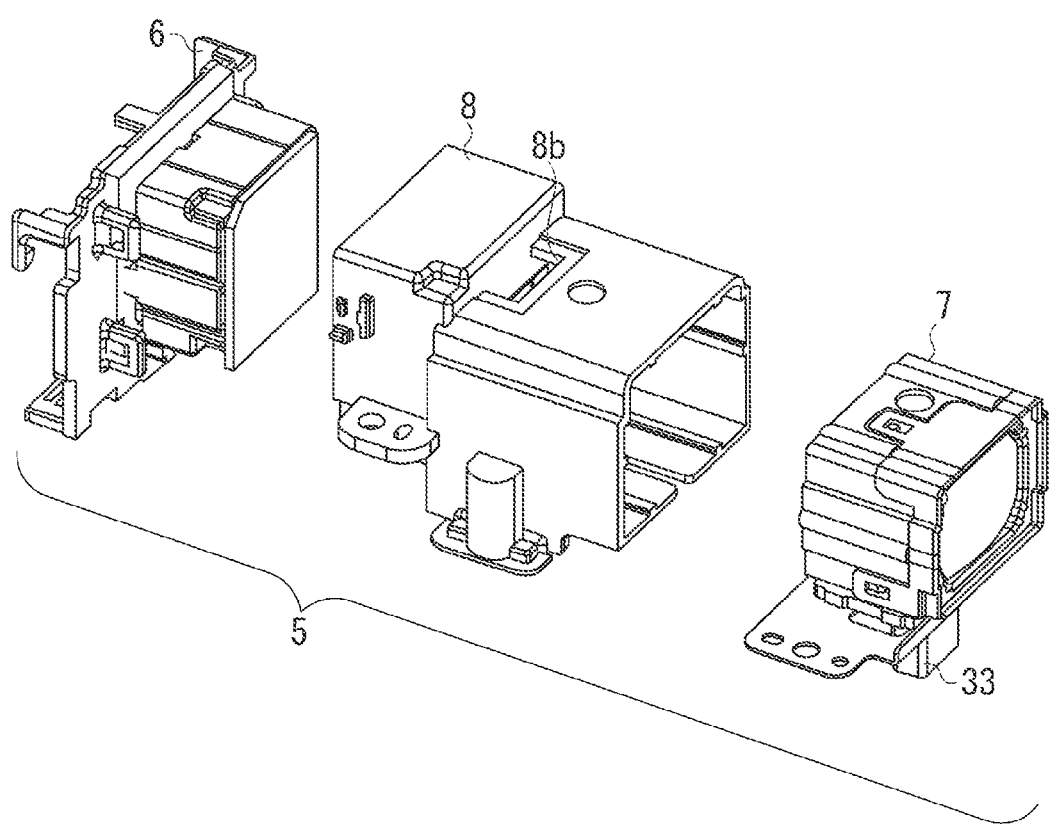
FIG. 3 is an exploded perspective view of a viewfinder assembly.

FIG. 3 is an exploded perspective view of the viewfinder assembly 5. The viewfinder assembly 5 includes a display unit portion 6, an eyepiece lens unit portion 7, and a cover member 8. The cover member 8 retains the display unit portion 6 and the eyepiece lens unit portion 7. The display unit portion 6 corresponds to a display unit integrating a display module 9 and a dust-proof plate 11, and the eyepiece lens unit portion 7 corresponds to an eyepiece lens unit integrating a plurality of lenses with each other.

A diopter adjustment knob 33 is formed to protrudes under the eyepiece lens unit portion 7, allowing diopter adjustment as described below. An opening 8b is formed in the upper portion of the cover member 8.

Figure 4:
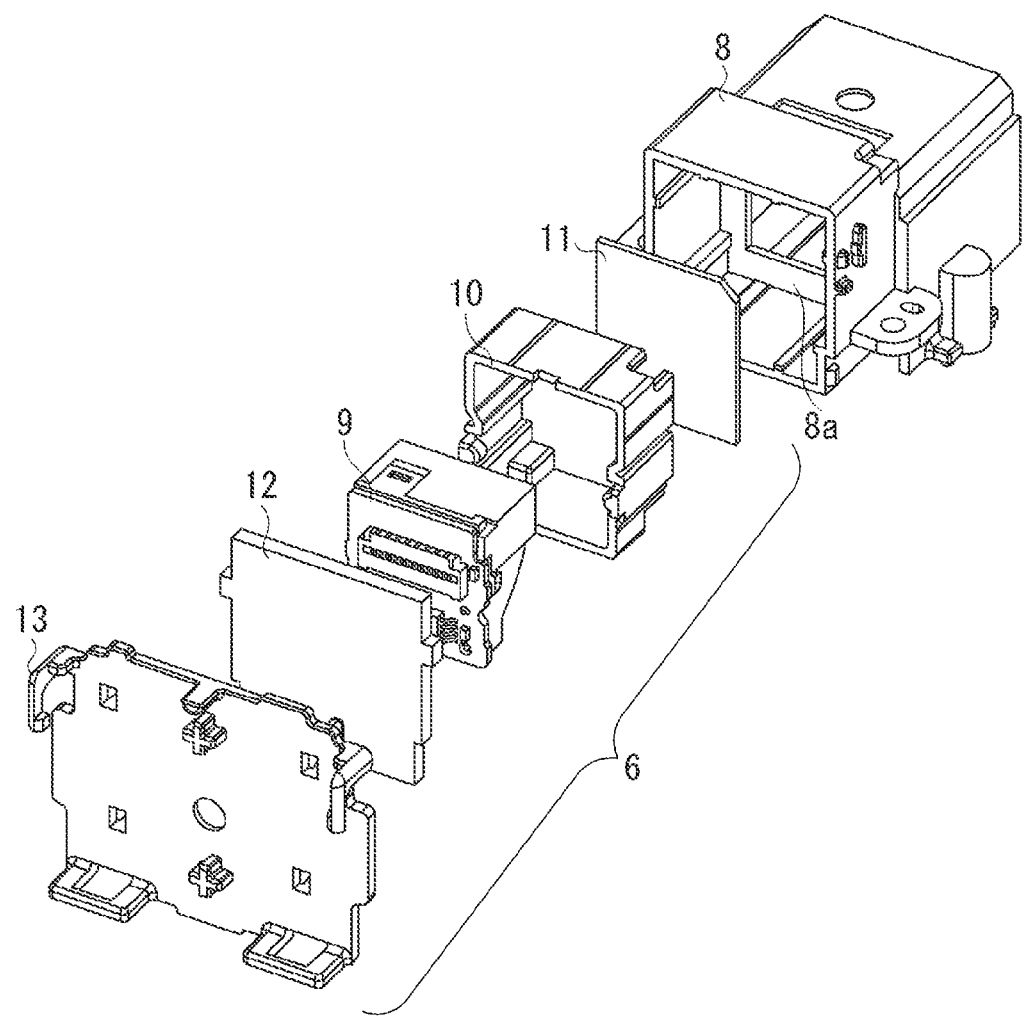
FIG. 4 is an exploded perspective view of a display unit portion.

FIG. 4 is an exploded perspective view of the display unit portion 6. The display unit portion 6 includes the display module 9, a display module holder 10, the dust-proof plate 11, an elastic member 12, and a lid member 13. The display module 9 displays an image based on a video signal during shooting. The display module holder 10 retains the display module 9. The dust-proof plate 11 is provided behind the display module 9, and protects the display module 9 from dust or the like. The elastic member 12 is held in a compressed state between the lid member 13 and the cover member 8, thereby urging the display module 9, the display module holder 10, and the dust-proof plate 11 toward the cover member 8.

Figure 5:
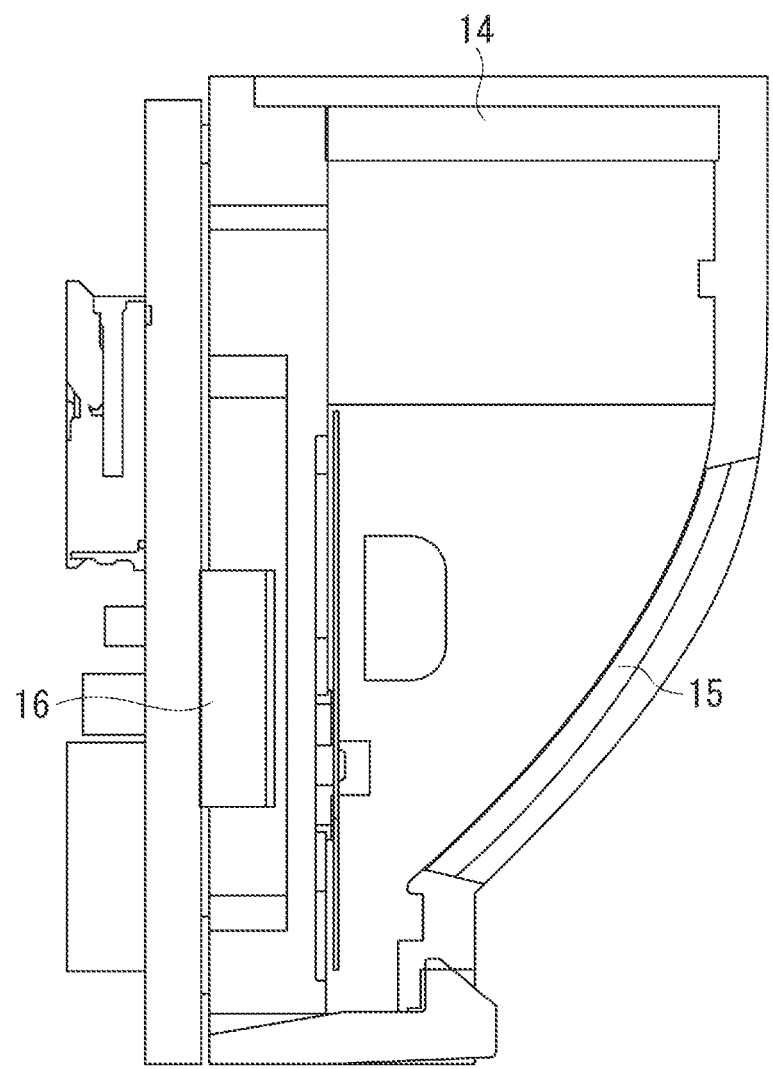
FIG. 5 is a sectional view illustrating the structure of a display module.

FIG. 5 is a sectional view illustrating the structure of the display module 9. In the present exemplary embodiment, the display module 9 uses a reflection type liquid crystal display; it reflects light emitted from a light source 14 by a film surface 15, and irradiates an image display surface 16 to obtain a light quantity, thereby displaying an image.

Next, the sealing structure of the display unit portion 6 will be illustrated with reference to FIGS. 4, 6, 7, and 8.

In the case where foreign matter such as dust has entered the display module 9, such dust can be visually recognized by the user using the viewfinder, which makes the displayed image rather hard to observe. Thus, it is necessary to equip dust-proof so that dust does not adhere to the display module 9. As illustrated in FIG. 4, in the present exemplary embodiment, the members are successively urged from the front side toward the rear side in the optical axis direction, whereby the display unit portion 6 is sealed, or at least substantially sealed. Description is made according to an order of assembling the display unit portion 6.

Figure 6:
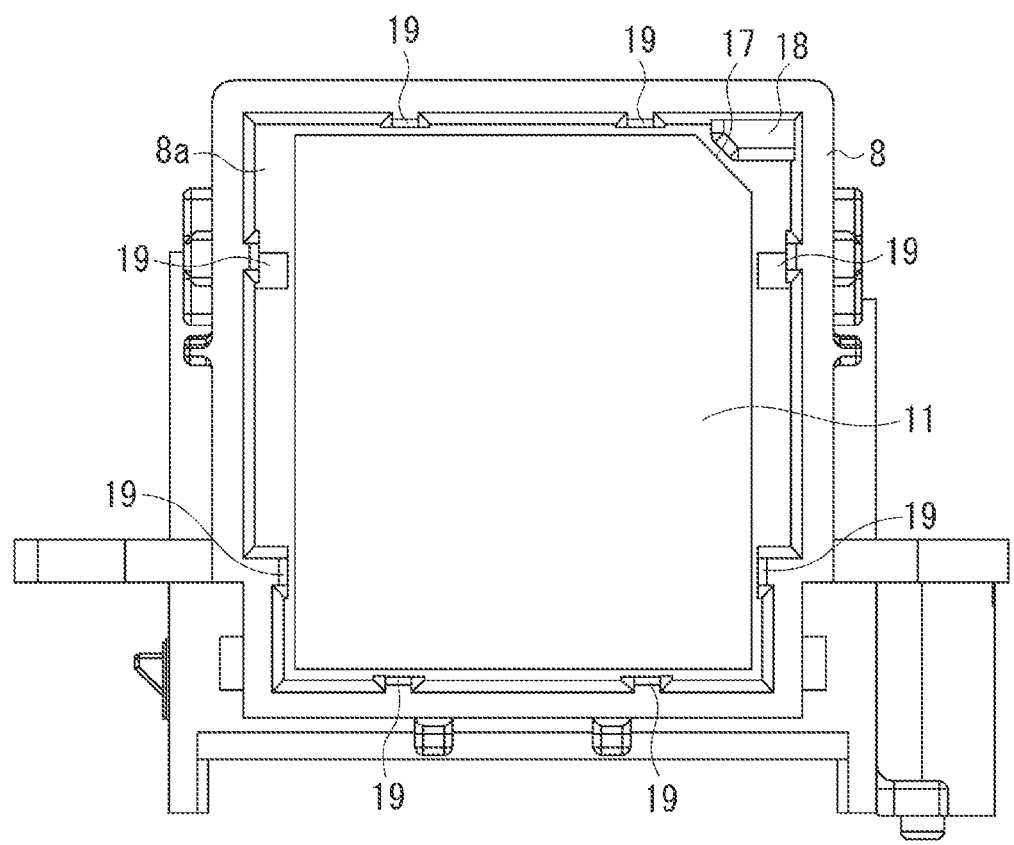
FIG. 6 is a diagram, as seen from the front side of a dust-proof plate, illustrating how the dust-proof plate is incorporated into a cover member.

FIG. 6 is a diagram, as seen from the front side of the dust-proof plate 11, illustrating the state where the dust-proof plate 11 is incorporated into the cover member 8. The dust-proof plate 11 has a cutout portion 17, which is engaged with a protrusion portion 18 of the cover member 8 solely at the correct position. The dust-proof plate 11 is incorporated into the cover member 8 in the direction as indicated in FIG. 6, and is caused to abut on an inner wall 8a of the cover member 8. The dust-proof plate 11 cannot be incorporated into the cover member 8 in any other direction than that indicated in FIG. 6.

The dust-proof plate 11 is set in position with respect to the cover member 8 by causing the upper, lower, right-hand, and left-hand sides of the dust-proof plate 11 to abut on a positioning rib 19 formed on the cover member 8.

Figure 7:
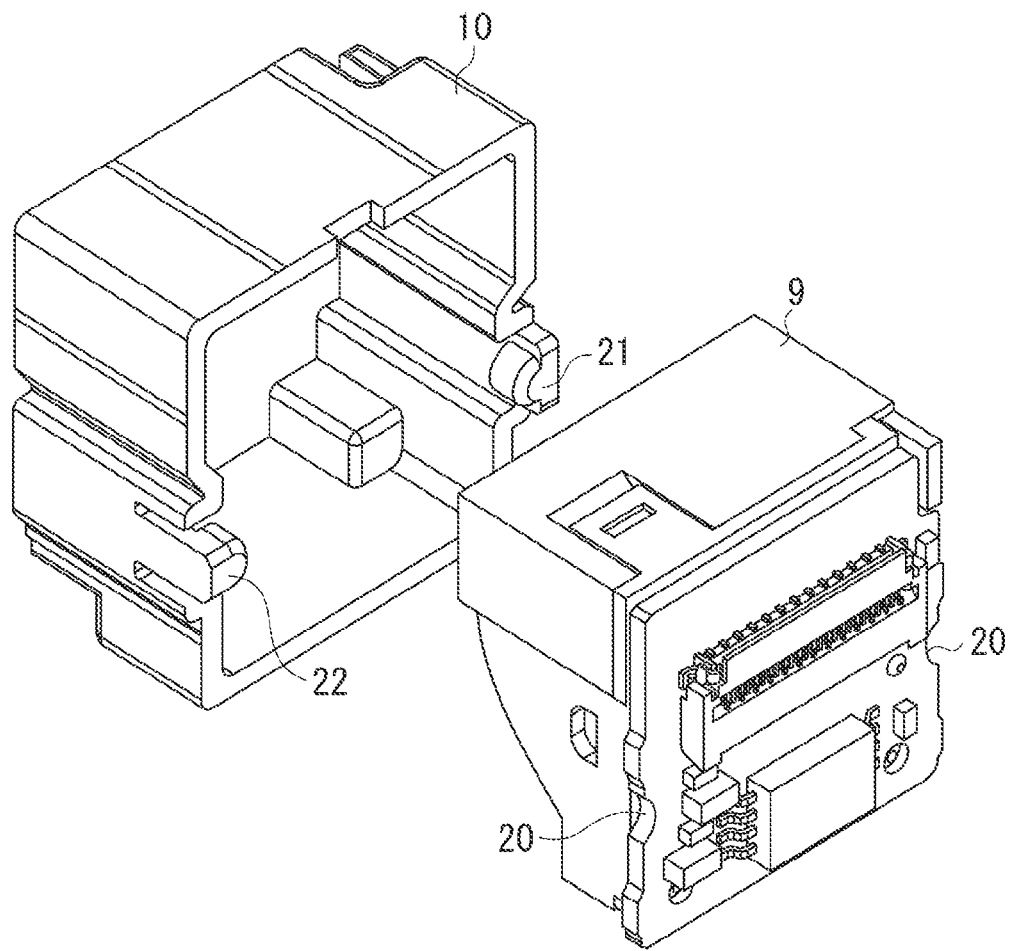
FIG. 7 is a perspective view illustrating how the display module is mounted to a display module holder.

Next, the display module holder 10 and the display module 9 are incorporated in that order. As illustrated in FIG. 7, the display module 9 has cutout portions 20 for positioning, and the display module holder 10 has a positioning rib 21 and an elastic urging rib 22. The cutout portions 20 of the display module 9 are respectively engaged with the positioning rib 21 and the urging rib 22 of the display module holder 10, whereby the display module 9 is set in position with respect to the display module holder 10. The display module 9 is urged to one side with respect to the display module holder 10, whereby variation in position due to play is mitigated.

Figure 8:
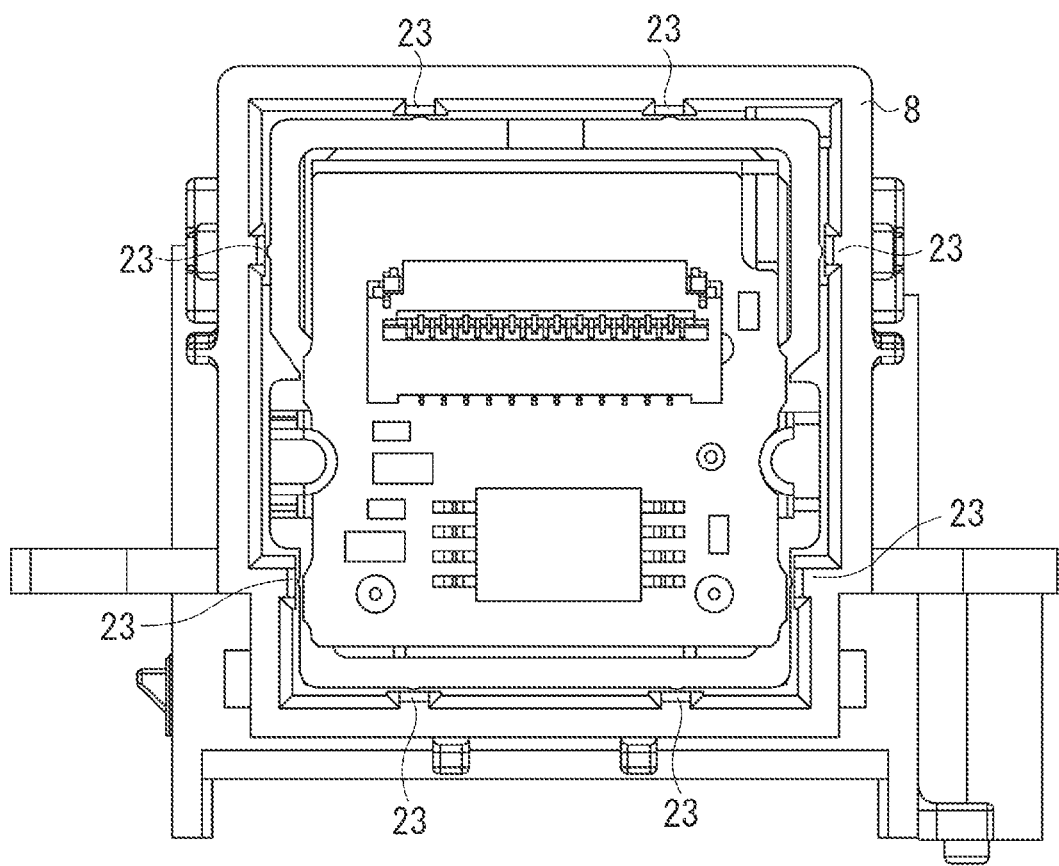
FIG. 8 is a diagram, as seen from the front side of the dust-proof plate, illustrating how the dust-proof plate, the display module holder, and the display module are incorporated into the cover member.

FIG. 8 is a diagram, as seen from the front side of the dust-proof plate 11, illustrating a state where the dust-proof plate 11, the display module holder 10, and the display module 9 are incorporated. Specifically, the diagram illustrates a state, starting from the state of FIG. 6, where the display module holder 10 and the display module 9 are incorporated into the cover member 8. As illustrated in FIG. 8, sliding portions 23 are formed on the cover member 8; by causing the sliding portions 23 to slide, it is possible for the display module holder 10 to be smoothly incorporated into the cover member 8.

Figure 9:
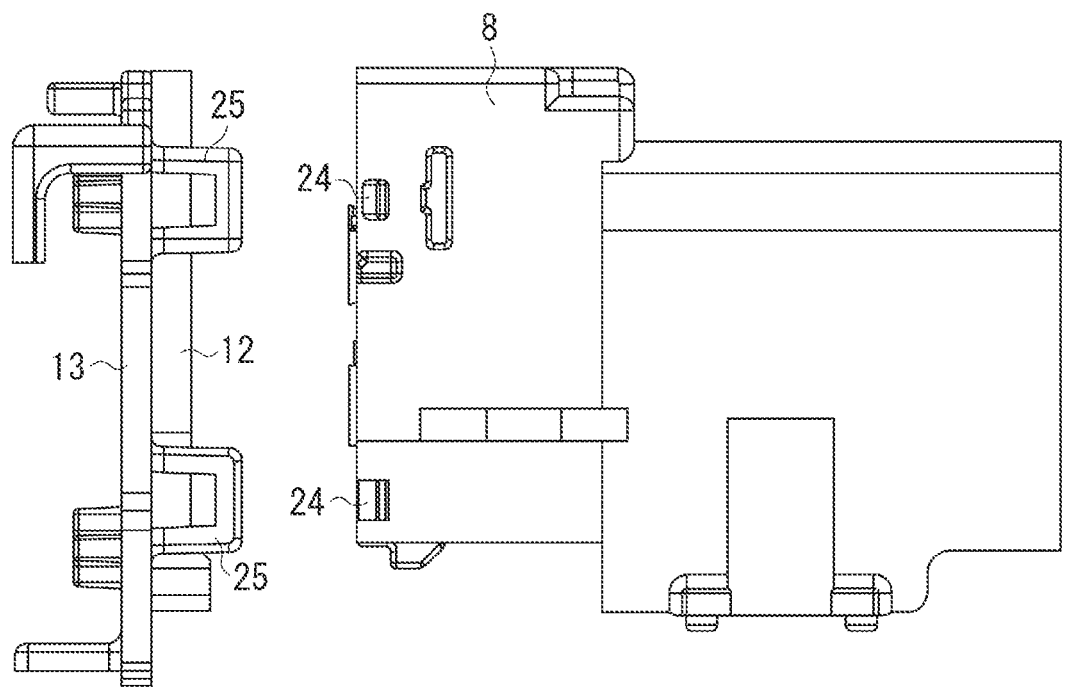
FIG. 9 is a diagram illustrating how a component integrating an elastic member and a lid member is mounted to the cover member.

After the display module holder 10 and the display module 9 is incorporated into the cover member 8, the elastic member 12 and the lid member 13 are integrally mounted to the cover member 8. FIG. 9 is a diagram illustrating a state where a component integrating the elastic member 12 and the lid member 13 is mounted to the cover member 8. As illustrated in FIG. 9, a claw 24 formed on the cover member 8 and a hook 25 formed on the lid member 13 are engaged with each other, whereby the lid member 13 is mounted to the cover member 8. In this case, the elastic member 12 is held between the cover member 8 and the lid member 13 in a compressed state. Accordingly, the elastic member 12 urges the display module 9, the display module holder 10, and the dust-proof plate 11 toward the inner wall 8a of the cover member 8. As a result, the rear surface of the dust-proof plate 11 is brought into intimate contact with the inner wall 8a of the cover member 8, whereby the space from the dust-proof plate 11 to the display module 9 is sealed.

Figure 10A:
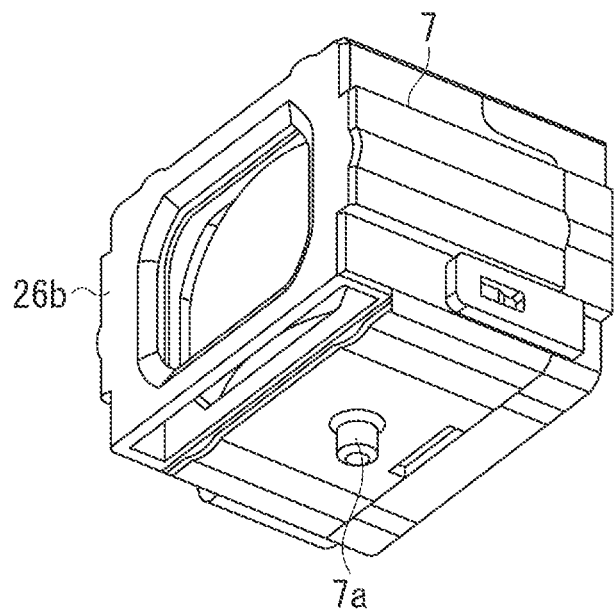
FIGS. 10A and 10B are external perspective views of an eyepiece lens unit portion.
Figure 10B:
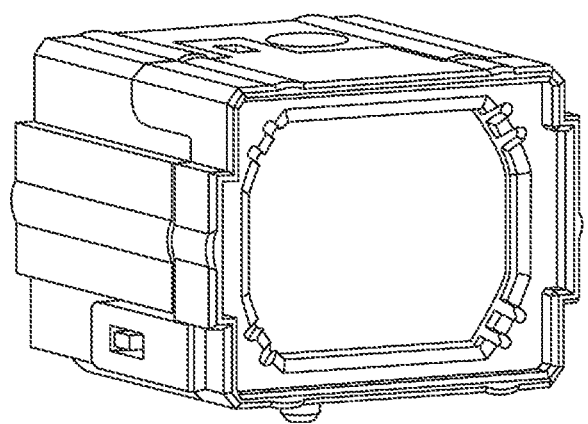

FIGS. 10A and 10B are external perspective views of the eyepiece lens unit portion 7. The eyepiece lens unit portion 7 enlarges a finder image displayed on the display module 9. By moving the eyepiece lens unit portion 7 in the optical axis direction, the position of the eyepiece lens unit portion 7 with respect to the display module 9 is varied, whereby it is possible to make a diopter adjustment in conformity with the eyesight of the observer. In other words, the eyepiece lens unit portion 7 corresponds to an eyepiece lens, which is arranged on the observer side of the dust-proof plate 11 to be movable in the optical axis direction.

A boss 7a arranged on the lower surface of the eyepiece lens unit portion 7 illustrated in FIG. 10A connects with a diopter adjustment knob 33. As a result, through the operation of the diopter adjustment knob 33 by the observer, the eyepiece lens unit portion 7 moves in the optical axis direction, and its position with respect to the display module 9 is varied. In other words, through the operation of the diopter adjustment knob 33 by the observer, it is possible to make diopter adjustment.

Figure 11:
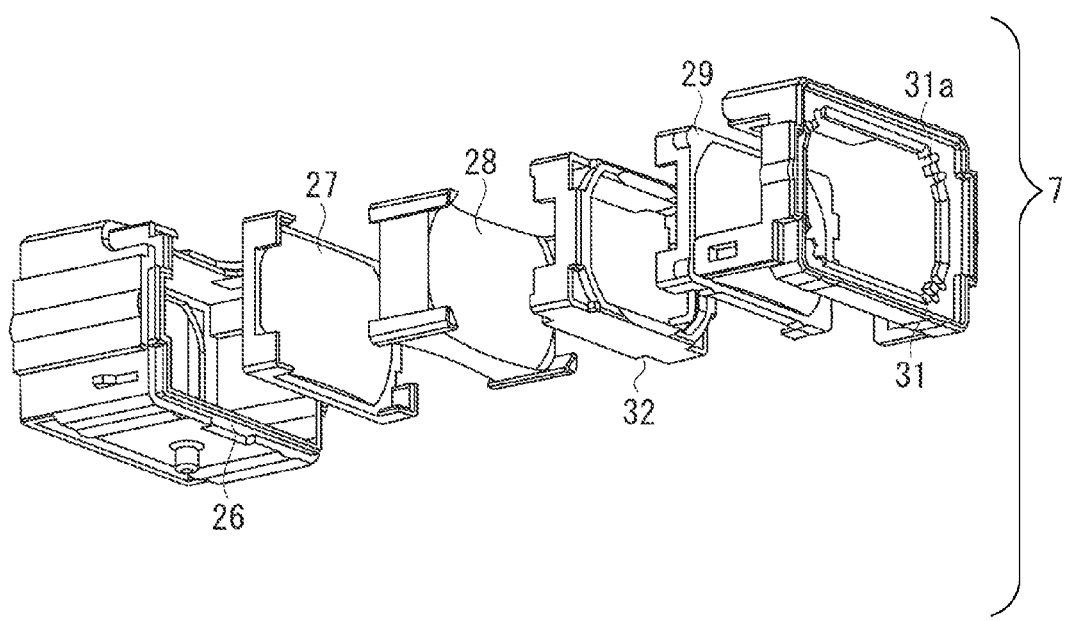
FIG. 11 is an exploded perspective view of the eyepiece lens unit portion.

FIG. 11 is an exploded perspective view of the eyepiece lens unit portion 7. The eyepiece lens unit portion 7 accommodates a box-like lens holder 26, a first-unit eyepiece lens 27, a second-unit eyepiece lens 28, and a third-unit eyepiece lens 29, which are covered up by a holder cover 31. Further, between the second-unit eyepiece lens 28 and the third-unit eyepiece lens 29, a mask 32 for shielding the display module 9 against unnecessary light is arranged.

Next, a method of setting the first-unit eyepiece lens 27, the second-unit eyepiece lens 28, and the third-unit eyepiece lens 29 in position with respect to the lens holder 26 will be illustrated. The first-unit eyepiece lens 27 has convex configurations on both sides. The second-unit eyepiece lens 28 has concave configurations on both sides. The third-unit eyepiece lens 29 has convex configurations on both sides.

Figure 14:
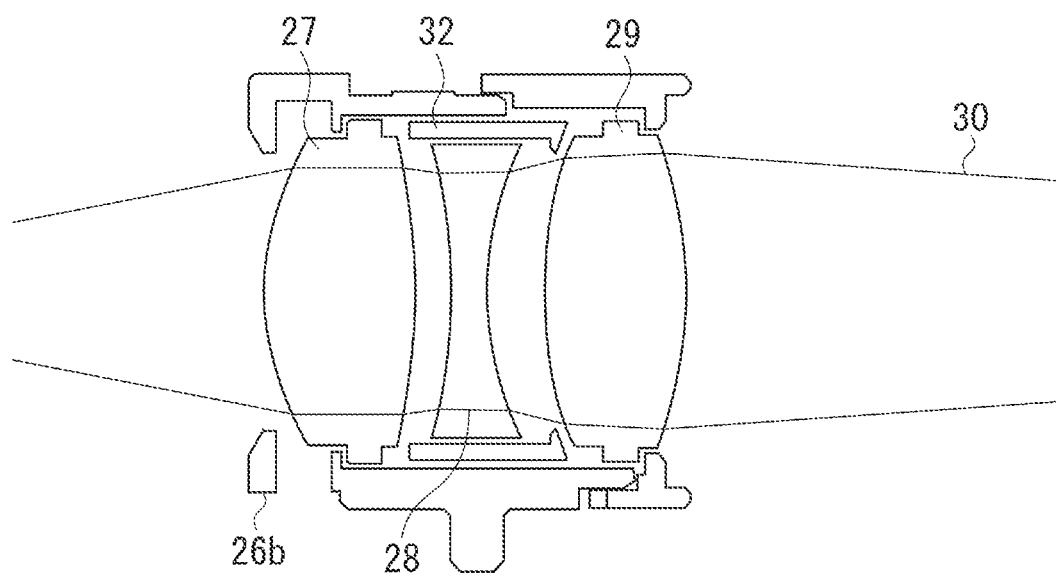
FIG. 14 is a sectional view of the eyepiece lens unit portion.

FIG. 14 is a sectional view of the eyepiece lens unit portion 7; light 30 is emitted from the display module 9. As illustrated in FIG. 14, the requisite range for allowing the requisite light for observing the image displayed on the display module 9 to enter, is larger in the first-unit eyepiece lens 27 and the third-unit eyepiece lens 29 than in the second-unit eyepiece lens 28. Thus, the outer size of the first-unit eyepiece lens 27 and of the third-unit eyepiece lens 29 needs to be larger than the outer size of the second eyepiece lens 28.

Figure 12A:
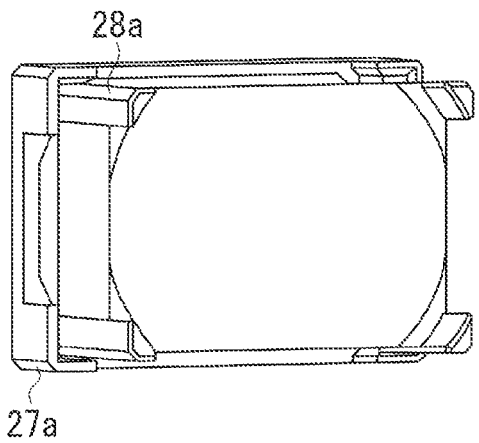
FIGS. 12A, 12B, and 12C are main portion perspective views illustrating the eyepiece lens unit portion as assembled.
Figure 12B:
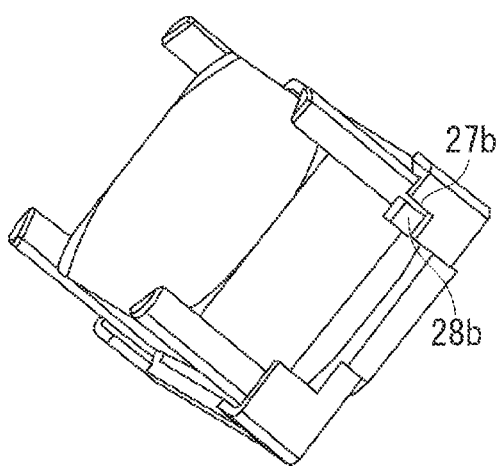
Figure 12C:
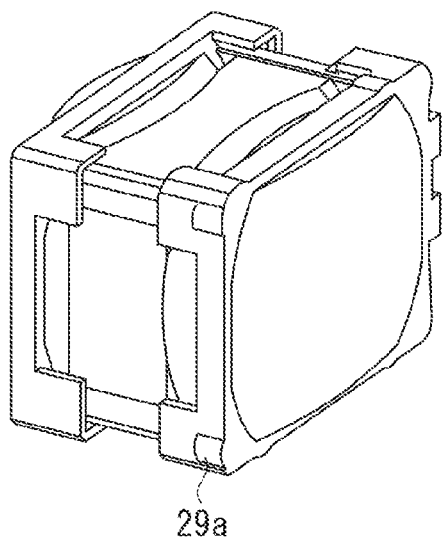

Next, the configuration of the eyepiece lens will be described. FIGS. 12A through 12C are main portion perspective views illustrating the eyepiece lens unit portion 7 as assembled. As illustrated in FIG. 12A, insertion is effected such that ribs 27a formed at the four corners of the first-unit eyepiece lens 27 are engaged with ribs 28a formed at the four corners of the second-unit eyepiece lens 28, which is one size smaller. As a result, the first-unit eyepiece lens 27 and the second-unit eyepiece lens 28 are set in position. As illustrated in FIG. 12C, the third-unit eyepiece lens 29 is also inserted to be engaged with the second-unit eyepiece lens 28, whereby the second-unit eyepiece lens 28 and the third-unit eyepiece lens 29 are set in position. Further, by ribs 29a provided in the outer periphery of the third-unit eyepiece lens 29, the optical axis center of the third-unit eyepiece lens 29 is set in position with respect to the lens holder 26. As a result, the optical axis centers of the first-unit eyepiece lens 27, the second-unit eyepiece lens 28, and the third-unit eyepiece lens 29 can be accurately matched with the field angle center of the display module 9.

In its normal uses, the viewfinder 1 is scarcely used upside down, so that, in the present exemplary embodiment, the effect of the gravitational force is taken into account, and the upper and lower portions of the second-unit eyepiece lens 28 are not in perfect symmetry with respect to the optical axis center. Further, the shape of front surface and rear surface of the lens are different from each other with respect to the second-unit eyepiece lens 28. In addition, the first-unit eyepiece lens 27 and the second-unit eyepiece lens 28 has similar shape to each other. Thus, as illustrated in FIG. 12B, to prevent erroneous assembly, the second-unit eyepiece lens 28 has a protrusion 28b, and the first-unit eyepiece lens 27 has a recess 27b. As a result, only when the first-unit eyepiece lens 27 and the second-unit eyepiece lens 28 are combined in the correct orientation, the protrusion 28b of the second-unit eyepiece lens 28 is engaged with the recess 27b of the first-unit eyepiece lens 27.

The third-unit eyepiece lens 29 is provided with no such configuration as described above. This helps to prevent erroneous assembly. More specifically, if the first-unit eyepiece lens 27 and the third-unit eyepiece lens 29 are mistaken for the other, the second-unit eyepiece lens 28 cannot be incorporated. Further, if the second-unit eyepiece lens 28 is incorporated in a horizontally opposite direction, it interferes with the first-unit eyepiece lens 27. Further, if an attempt is made to incorporate the second-unit eyepiece lens 28 upside down, the third-unit eyepiece lens 29 cannot be incorporated.

Further, the first-unit eyepiece lens 27, the second-unit eyepiece lens 28, and the third-unit eyepiece lens 29 are set in position in the optical axis direction by being held between the lens holder 26 and the holder cover 31. In the present exemplary embodiment, the holder cover 31 includes an arm 31a charging each eyepiece lens in the direction of the display unit portion 6; by incorporating the holder cover 31, any play in the optical axis direction of the eyepiece lenses is eliminated, so that there is no fear of the eyepiece lenses being toppled over.

Figure 13A:
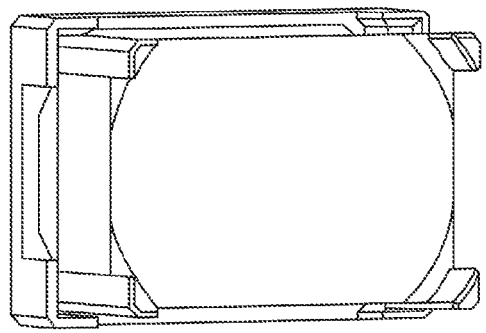
FIGS. 13A, 13B, and 13C are perspective views illustrating how a mask is arranged between a second-unit eyepiece lens and a third-unit eyepiece lens.
Figure 13B:
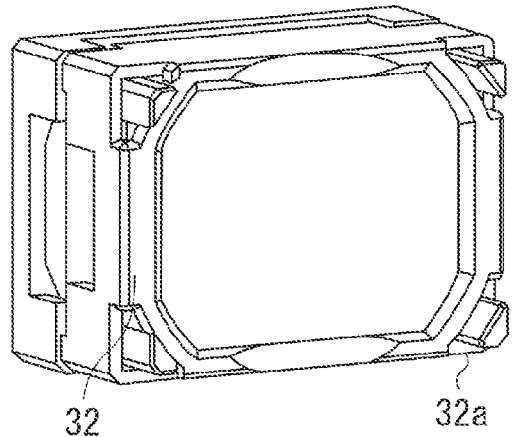
Figure 13C:
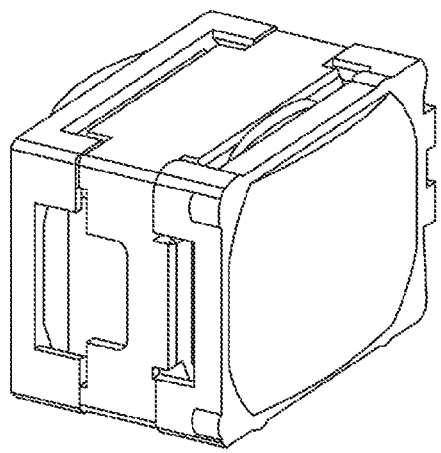

FIGS. 13A through 13C are perspective views illustrating a state where the mask 32 is arranged between the second-unit eyepiece lens 28 and the third-unit eyepiece lens 29. As illustrated in FIG. 14, the light 30 is narrowed down by the second-unit eyepiece lens 28, so that the requisite diameter of the second-unit eyepiece lens 28 is smaller than that of the first-unit eyepiece lens 27 and the third-unit eyepiece lens 29. However, since the eyepiece lens unit portion 7 may be formed as a rectangular parallelepiped, a gap is generated around the second-unit eyepiece lens 28. Thus, there is a fear of an adverse effect of unnecessary light, such as the light allowed to directly enter the third-unit eyepiece lens 29 from the first-unit eyepiece lens 27 without passing by way of the second-unit eyepiece lens 28. In the present exemplary embodiment, to avoid such an adverse effect, the mask 32 is arranged between the second-unit eyepiece lens 28 and the third-unit eyepiece lens 29. The mask 32 is arranged in the extension of the lens surface of the second-unit eyepiece lens 28, and has an opening through which the light 30 passes.

As illustrated in FIG. 13B, the mask 32 has holes 32a at positions corresponding to the ribs 28a formed on the second-unit eyepiece lens 28. By arranging the mask 32 with respect to the second-unit eyepiece lens 28 such that the ribs 28a of the second-unit eyepiece lens 28 are inserted into the holes 32a, positioning is effected between the mask 32 and the second-unit eyepiece lens 28. Further, as illustrated in FIG. 13C, the mask 32 is fixed in position in the optical axis direction by being held between the ribs 27a of the first-unit eyepiece lens 27 and the ribs 29a of the third-unit eyepiece lens 29.

Further, as illustrated in FIG. 14, to restrict the unnecessary light allowed to enter the first-unit eyepiece lens 27, a mask portion 26b is formed on the viewfinder panel surface side of the lens holder 26. As illustrated in FIG. 10A, in the present exemplary embodiment, the mask portion 26b is formed by making, from under the lens holder 26, a hole between the mask portion 26b and the first-unit eyepiece lens 27 retaining surface. Thus, while preventing intrusion of dust into the eyepiece lens unit portion 7, there may be no need to form the mask portion as a separate member, which means there may be no increase in the number of components.

Owing to the above construction, the eyepiece lens unit portion 7 allows the optical axis centers of the first-unit eyepiece lens 27, the second-unit eyepiece lens 28, and the third-unit eyepiece lens 29 to be accurately matched with the screen center of the display module 9. As a result, it is possible to secure a satisfactory optical performance, to prevent intrusion of dust into the intervals between the eyepiece lenses, and to achieve an improvement in terms of visibility through a reduction in the effect of unnecessary light.

Owing to the above construction, the display unit portion 6 and the eyepiece lens unit portion 7 are made dust-proof by being sealed in the respective units. However, the rear surface of the dust-proof plate 11, the front surface of the first-unit eyepiece lens 27, and the rear surface of the third-unit eyepiece lens 29 are not sealed, and there is a fear of dust being allowed to adhere thereto.

Figure 15:
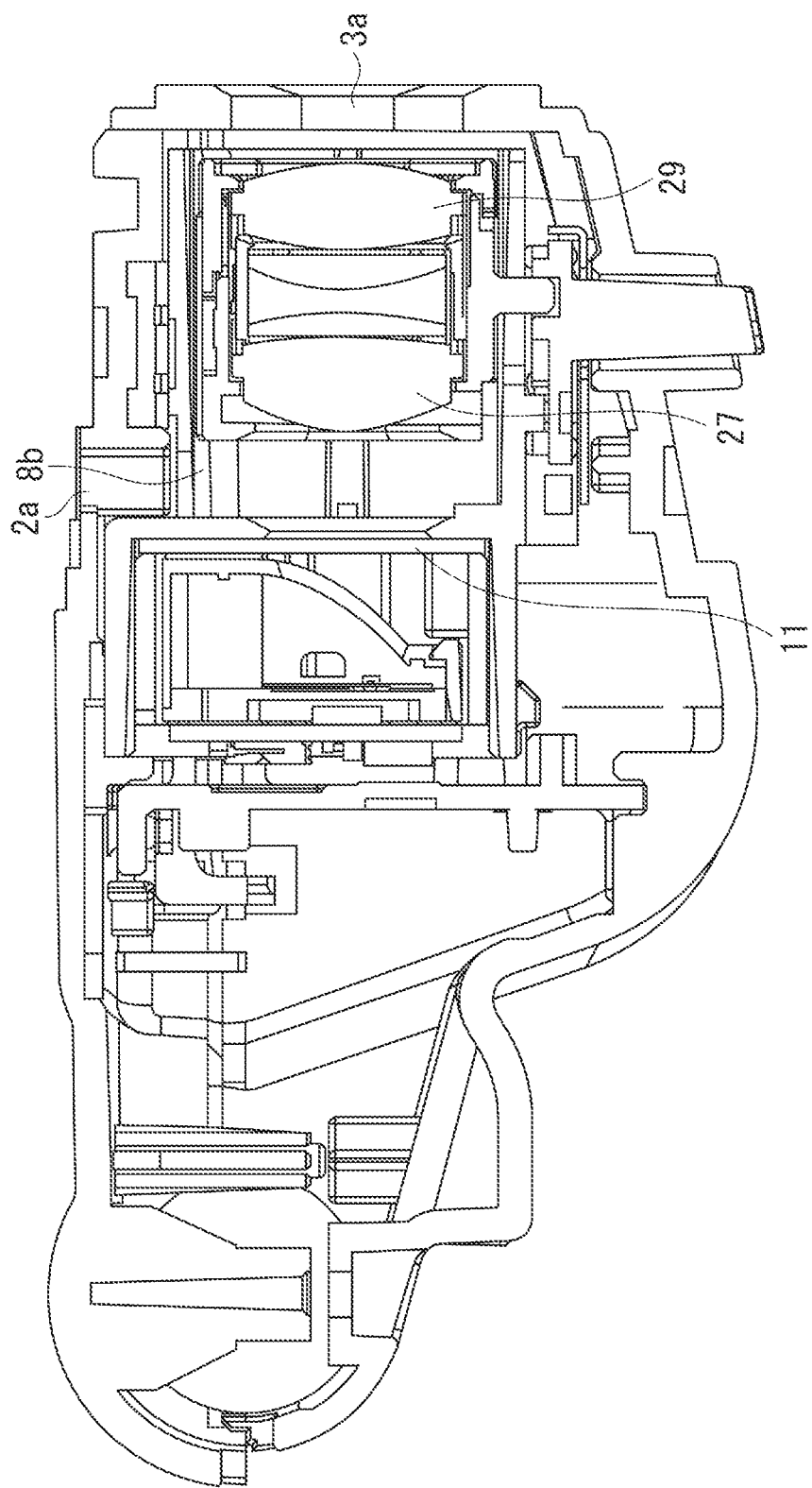
FIG. 15 is a sectional view illustrating how the viewfinder assembly, an upper cover, and a lower cover are combined with each other.

FIG. 15 is a sectional view illustrating a state where the viewfinder assembly 5, the upper cover 2, and the lower cover 3 are combined with each other. The opening 8b formed in the upper portion of the cover member 8 serves to allow insertion of a blower to clean the rear surface of the dust-proof plate 11 and the front surface of the first-unit eyepiece lens 27. Specifically, the opening 8b corresponds to the opening to remove foreign matter adhering to the surface of the dust-proof plate 11 opposed to the eyepiece lens unit portion 7 and to the surface of the front eyepiece lens unit portion 7 opposed to the dust-proof plate 11.

As illustrated in FIG. 15, the opening 2a of the upper cover 2 and the opening 8b of the cover member 8 are matched with each other in the longitudinal direction of the viewfinder 1. Thus, by inserting the distal end of a blower through the opening 2a of the upper cover 2, the distal end of the blower enters the opening 8b of the cover member 8; alternatively, gas ejected from the distal end of the blower enters the opening 8b of the cover member 8. This helps to clean the rear surface of the dust-proof plate 11 and the front surface of the first-unit eyepiece lens 27.

In this case, the space from the dust-proof plate 11 to the display module 9 is sealed, so that the distal end of the blower does not come into contact with the display module 9, nor does the gas ejected from the distal end of the blower directly damage the display module 9.

As illustrated in FIG. 1, by attaching an eyecup 4, the opening 2a of the upper cover 2 and the opening 8b of the cover member 8 are covered with the eyecup 4, whereby the opening 2a and the opening 8b is prevented from entering of a dust.

As illustrated in FIG. 15, the rear surface of the third-unit eyepiece lens 29 is exposed through the opening 3a, so that it is possible to clean the rear surface of the third-unit eyepiece lens 29 through the opening 3a.

As illustrated above, in the present exemplary embodiment, the space from the dust-proof plate 11 to the display module 9 is formed as a sealed space, whereas the space in which the eyepiece lens unit portion 7 moves in the optical axis direction is formed as an open space. And, the cover member 8 has the opening 8b which allows cleaning of the rear surface of the dust-proof plate 11 and the front surface of the first-unit eyepiece lens 27. As a result, it is possible to effectively remove foreign matter such as dust adhering to the rear surface of the dust-proof plate 11 and the front surface of the first-unit eyepiece lens 27 without damaging the display module 9.

Further, the dust-proof plate 11 is arranged between the display module 9 and the first-unit eyepiece lens 27, so that no external light is allowed to directly impinge upon the dust-proof plate 11. Thus, there is no need for the surface of the dust-proof plate 11 to be provided with a coating for preventing reflection, whereby it is possible to achieve a reduction in man-hours and cost.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-187127 filed Aug. 24, 2010, which is hereby incorporated by reference herein in its entirety.

What is claimed is:

1. An imaging apparatus comprising:
    a display module which has a film surface;
       a dust-proof plate arranged on an observer side of the display module;
       a holder retaining the display module;
       an eyepiece lens arranged on an observer side of the dust-proof plate and movable in an optical axis direction;
       a cover member retaining the holder, the dust-proof plate and the eyepiece lens; and
       an elastic member mounted to the cover member,
       wherein the elastic member urges the display module, the holder, and the dust-proof plate toward the cover member whereby a space between the display module and the dust-proof plate is sealed, and
       wherein the cover member has an opening for removing foreign matter adhering to a surface of the dust-proof plate opposed to the eyepiece lens and to a surface of the eyepiece lens opposed to the dust-proof plate.

2. The imaging apparatus according to claim 1, wherein the cover member has an inner wall, and
    wherein the elastic member urges the display module, the holder, and the dust-proof plate toward the inner wall.

3. The imaging apparatus according to claim 1, wherein the display module has a light source, and wherein the film surface is configured to reflect light from the light source to an image display surface.

4. The imaging apparatus according to claim 1, wherein the imaging apparatus has a detachable eyecup, and
    wherein in a case where the detachable eyecup is attached to the imaging apparatus, the opening is covered by the eyecup.

5. The imaging apparatus according to claim 1, further comprising:
    a lid member mounted to the cover member,
    wherein in a case where the lid member is mounted to the cover member, the elastic member is held between the cover member and the lid member in a compressed state, whereby the elastic member urges the display module, the holder, and the dust-proof plate toward the cover member.

* * * * *